April 26, 1938.　　　　　B. FELSHER　　　　　2,115,257
BABY WALKER CONVERTIBLE INTO HIGH CHAIR
Filed May 11, 1937
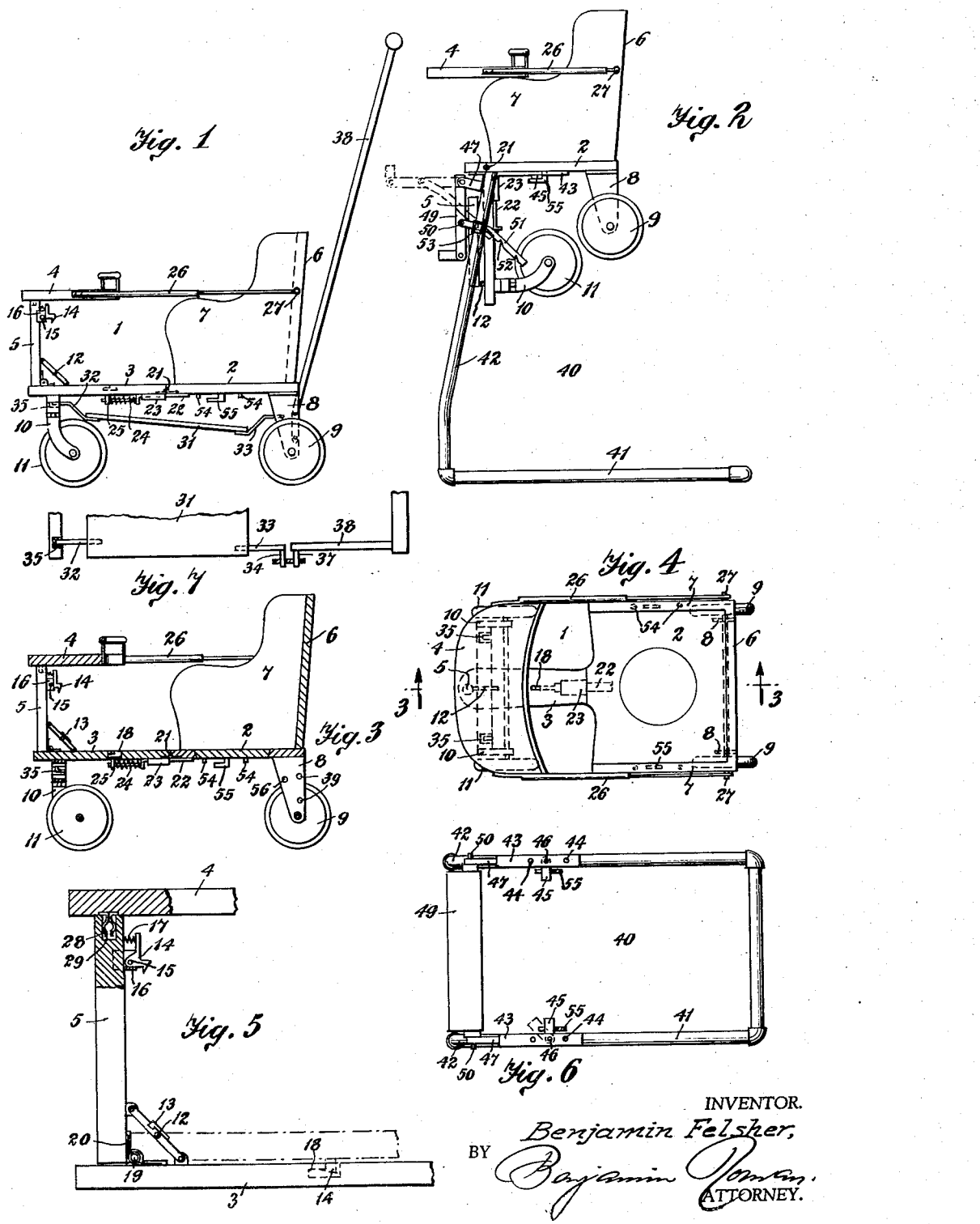
INVENTOR.
Benjamin Felsher,
BY
ATTORNEY.

Patented Apr. 26, 1938

2,115,257

UNITED STATES PATENT OFFICE 2,115,257

BABY WALKER CONVERTIBLE INTO HIGH CHAIR

Benjamin Felsher, Brooklyn, N. Y.

Application May 11, 1937, Serial No. 141,911

5 Claims. (Cl. 155—38)

This invention relates to a baby walker which may be converted into a baby high chair, and its principal object is to provide a simplified, low cost, economically and conveniently manufacturable, conveniently utilizable and convertible, efficient, strong, durable, reliable, and improved article for this purpose.

Other objects and advantages will hereinafter appear.
In the accompanying drawing,—

Fig. 1 is a side elevation of the device as it appears when utilized as a baby walker.

Fig. 2 is a side elevation of the article as it appears when converted to serve the function of a baby high chair.

Fig. 3 is a longitudinal cross-sectional elevation of the baby walker shown in Fig. 1.

Fig. 4 is a plan view of the baby walker shown in Fig. 1.
Fig. 5 is a side elevation, in an enlarged scale, partially in cross-section, showing the upright post for the tray portion of the device.

Fig. 6 is a plan view showing the stand utilized in converting the baby walker to the condition of a high chair.

Fig. 7 is a fragmentary plan view showing a detail of the device.

The baby walker 1 comprises a seat 2, an extension 3 thereof, and a tray 4 supported upon a post 5. The seat 2 is provided with a back 6 and side arm walls 7. To the underside of seat 2 are secured legs 8, mounted on rear wheels 9, and to the underside of extension 3 are secured legs 10 upon which are mounted front wheels 11.
The post 5 is secured to extension 3 by means of a hinge 12, whereby the post may be disposed either in the upright operative position shown in Fig. 1 or it may be swung about said hinge to a position against the upper surface of extension 3 and parallel thereto. When swung to the upright state the post 5 is maintained against dislocation by the foldable linkage 13. A latch 14 hinged at 15 to a fitting 16 secured to post 5 is pressed upon by a spring 17, Fig. 5, and when said post is swung to a position against the extension 3, as shown by the dash and dot lines, Fig. 5, the latch 14 automatically engages a detent 18 formed in said saddle and thereby locks the latter with the post. Around the pintle 19 of hinge 12 is wound a spring 20 which bears against the post 5 and extension 3, whereby upon release of the latch 14 from engaging detent 18 the said spring automatically erects the post 5 to operative upright state.
The extension 3 is non-integral with seat 2, and is held to the latter by a hinge 21, whereby the saddle may be disposed either in alignment with said seat, as shown in Fig. 1, or it may be swung about said hinge to a position rightangular thereto, as illustrated in Fig. 2. When it is in its horizontal operative state the extension 3 may be locked in continuity with the seat 2 by means of a bolt 22 slidable in a sleeve 23 and actuated by a spring 24 pressing against the bolt and a projection 25 secured to the saddle, the bolt 22 emanating from sleeve 23 sliding under the seat 2. Upon withdrawal of bolt 22 from seat 2, contrary to tension of spring 24, it is released from said seat and permits the saddle 3 to drop downwardly, while swinging the extension backwardly to horizontal position automatically actuates said spring to bolt the saddle in locking engagement with the seat, as shown in Figs. 1, 3. The tray 4 is provided with a pair of telescopic arms 26 hingedly held at 27 to the back 6, by which means it may be slid horizontally to an extended position shown in Fig. 1, supported upon the post 5, or it may be slid backwardly to a collapsed position of arms 26, with the tray resting upon the arm walls 7 as shown in Fig. 2. When supported upon the post 5 the tray 4 is held positively thereto and against sliding action of its arms 26, by a spring-detent 28 secured to the tray lodging within a recess 29 formed in the terminal of post 5, as illustrated in Fig. 5.

As the baby walker 1 is also utilized as a carriage, with the infant seated, a foot-rest 30 is provided comprising a platform 31 having front lugs 32 and rear lugs 33 with rightangular terminals 34. The platform 31 is mountable in operative state on the carriage by inserting the extremities of its lugs 32 in sockets 35 of front legs 10 and slipping the rear terminals 34 in holes 36 formed in rear legs 8, as illustrated in Figs. 1, 3, and the entire foot-rest 30 may be similarly conveniently removed, as shown in Fig. 3, when it is desired to restore the carriage to its use as a baby walker. When used as a carriage a separable handle may be conveniently attached thereto by springing rightangular lugs 37 of said handle 38 into holes 39 formed in the rear legs 8, as shown in Figs. 1, 3, 7.

For utilizing the baby walker as a high chair there is provided a stand 40, preferably made of tubing and comprising a rectangular framing 41 serving as a floor support with a pair of posts 42 terminating in horizontal flattened brackets 43 having dowel holes 44 and cleats 45 pivoted at 46, Figs. 2, 6. To the upper ends of posts 42 are secured lugs 47 in which is hinged a swingable platform 49 serving as a rest for the infant's legs and feet, and to said platform is hinged at 50 a frame 51 having series of notches 52 that engage with a cross-bar 53 of the stand for adjustably elevating and lowering the platform 49, as shown by the dash and dot lines. For mounting the baby walker upon and demounting it from the stand 40, the underside of seat 2 of the former is provided with dowel pins 54 that are registrable with the holes 44 of the latter and hooks 55 that cooperate with the cleats 45.

When converting the baby walker, Fig. 1, to serve the function of a high chair as shown in Fig. 2, therefore, the forward end of tray 4 is lifted to remove its spring-cleat 28 from post-socket 29, and the tray is slid rightwardly to rest it upon the side walls 7. Then the linkages 13 are released and the post 5 swung against the extension 3, with the latch 14 engaging the detent 18. Then the bolt 22 is drawn toward the left to unlock the extension 3 from seat 2 and permit the former to drop downwardly to a position rightangular to said seat. And the baby walker being thus collapsed and altered it may be seated upon the brackets 43 of the stand 40, with the dowel pins 54 of seat 2 entering the holes 44 of said brackets, and the cleats 45 of the latter being turned into engagement with the hooks 55 for positively locking the seat 2 with the brackets 43 of the stand, in which manner the device may be utilized as a high chair in cooperation with the leg-platform 49. Normally, the consumer will initially utilize the device in its altered state in assemblage with the stand 40 as a high chair, Fig. 2, and when the infant reaches walking stages the device may be interchangeably converted into a baby walker, Fig. 1, as well as a high chair.

Variations may be resorted to within the scope of the invention.

Having thus described my invention, I claim:—

1. A baby walker comprising a seat having a frontal extension hinged thereto to swing downwardly from a position of alignment with the seat, means for locking said extension against swinging when it is in position of alignment with the seat, a post hinged to said extension to swing from an upright state thereon to a position of parallelism with the extension, a back-rest including forwardly extending arm-rests mounted upon the rear portion of said seat, a tray, extensible means mounting said tray upon said back-rest, whereby said tray may be withdrawn to rest upon said post or may be moved rearwardly to rest upon said arm-rests, said extension and post being movable away from their normal operative positions to an inoperative state, and said seat being provided with means for coaction with suitable devices upon an elevating stand whereby said walker may be mounted in an elevated position to form a high chair.

2. A baby walker comprising a seat having a frontal extension hinged thereto to swing downwardly from a position of alignment with the seat, a spring latch device upon the undersides of said seat and extension for locking said extension against swinging when it is in position of alignment with the seat, a post hinged to said extension to swing from an upright state thereon to a position of parallelism with the extension, means to lock said post to said extension when they are in parallelism with each other, a spring under tension against said post and extension operating to dispose the post in its upright state upon the unlocking of the post from the extension, a back-rest including forwardly extending arm-rests mounted upon the rear portion of said seat, a tray, extensible means mounting said tray upon said back-rest, whereby said tray may be withdrawn to rest upon said post or may be moved rearwardly to rest upon said arm-rests; said extension and post being movable away from their normal operative positions to an inoperative state, and said seat being provided with means for coaction with suitable devices upon an elevating stand whereby said walker may be mounted in an elevated position to form a high chair.

3. A baby walker comprising a seat having a frontal extension hinged thereto to swing downwardly from a position of alignment with the seat, means for locking said extension against swinging when it is in position of alignment with the seat, said extension being swingable out of alignment with said seat to an inoperative state, and said seat being provided with means for coaction with suitable devices upon an elevating stand whereby said walker may be mounted in an elevated position to form a high chair.

4. A baby walker comprising a seat having a frontal extension hinged thereto to swing downwardly from a position of alignment with the seat, a latching device upon said seat and extension for locking said extension against swinging when it is in position of alignment with the seat, said extension being swingable out of alignment with the seat to an inoperative state, and said seat being provided with means for coaction with suitable devices upon an elevating stand whereby said walker may be mounted in an elevated position to form a high chair.

5. A baby walker comprising a seat having a frontal extension hinged thereto to swing downwardly from a position of alignment with the seat, means for locking said extension against swinging when it is in position of alignment with the seat, said extension being swingable out of alignment with the seat to an inoperative state, and said seat being provided with means for coaction with suitable devices upon an elevating stand whereby said walker may be mounted in an elevated position to form a high chair.

BENJAMIN FELSHER.